Oct. 19, 1926.
E. C. WEISGERBER
VALVE
Filed Jan. 17, 1925
1,603,654
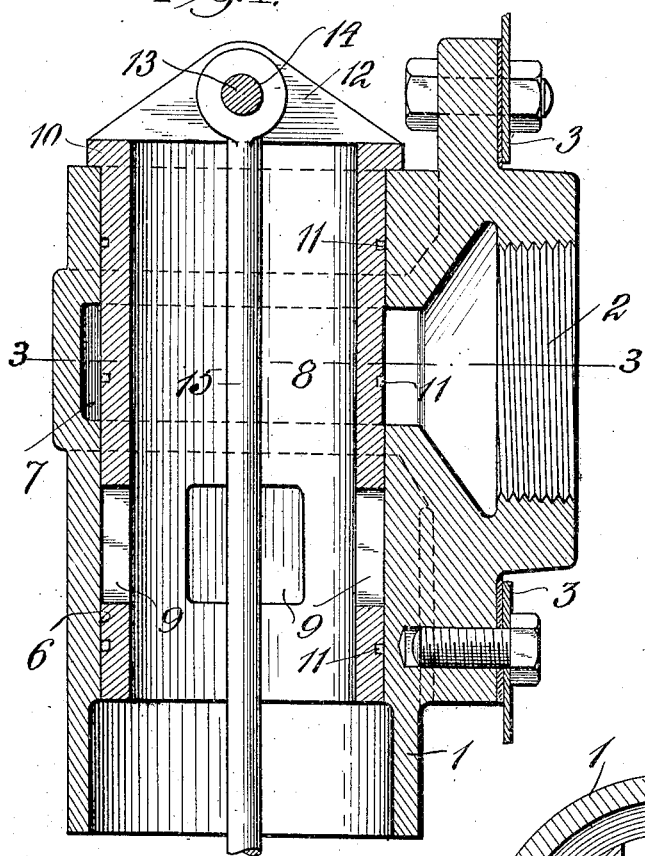
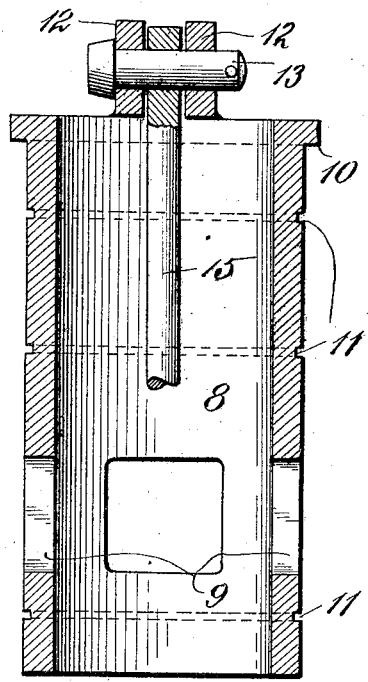
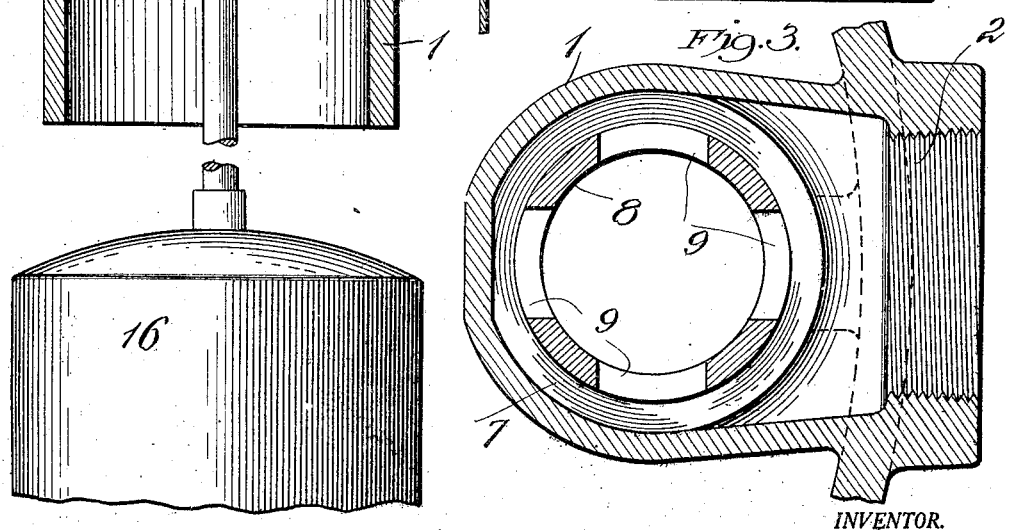
INVENTOR.
Edwin C. Weisgerber,
BY
ATTORNEY.

Patented Oct. 19, 1926.

1,603,654

UNITED STATES PATENT OFFICE.

EDWIN C. WEISGERBER, OF LONG BEACH, CALIFORNIA.

VALVE.

Application filed January 17, 1925. Serial No. 3,082.

My invention relates to a means for automatically controlling the flow of fluids and it has especial reference to a valve for use chiefly in governing the level of liquids in pressure tanks and particularly in oil and gas separating devices where an automatic regulation of the oil is required.

The object of the invention is to provide a simple valve for effecting the purpose stated in which the level of the liquid alone operates the same to control the quantity of fluid within a container and a further object of the invention is to provide a positive acting valve which is exceedingly sensitive and reliable and responds readily to the slightest fluctuation of the oil level.

Other objects will appear from the following specification in connection with the accompanying drawing which is illustrative of an embodiment of my invention and in which Fig. 1 is a sectional view of the valve, the housing, and the operating means for the valve.

Fig. 2 is a detail sectional view of the movable valve member, and

Fig. 3 is a sectional view taken substantially on line 3—3, Fig. 1, the valve member therein being shown in position of registration of its ports with the outlet in the housing.

The invention, as stated, is applicable to pressure apparatus, especially of the type known as gas and oil separators and while that particular application is comprehended by this disclosure, other applications of the invention are obviously included.

In its preferred form, the invention is shown as comprising a housing 1, formed with a horizontally extending outlet 2, protruding beyond the wall 3 of a container in which the valve is contained, and interiorly threaded for connection with a pipe, not shown.

The housing 1, as shown, is cylindrical and provided with a cylindrical bore 6, extending vertically therethrough, such bore being intersected by an annular inwardly extended passageway or groove 7, in line with the outlet 2. Within the housing 1, is a valve member 8, in substantially the form of a sleeve, operable vertically therein and provided near one end thereof with a plurality of ports 9, penetrating the wall of the sleeve and forming outlets for the fluid when same are in registry with the outlet 2 of the valve housing 1. The sleeve valve 8 is provided with an annular shoulder 10, by which it is supported from the top of the housing and by which the downward movement of the valve member is limited. The valve is also provided with peripheral grooves 11, forming annular oil pockets for keeping the sleeve lubricated. The open top of the valve sleeve 8 is bridged by a plurality of ears 12, traversed by a pin 13 which extending through the eye 14 of a rod 15, supports same. On the end of the rod 15 is adjustably mounted a float 16 which controls the operation of the valve sleeve 8 by the level of the fluid in which it is contained.

When the oil or other fluid in a container rises above a level predetermined by the float 16, the float, moving with such level, lifts the valve sleeve 8 steadily until the ports 9 thereof register with the annular passageway or groove 7 and the outlet 2 communicating with such groove or passageway which is diametrically greater than the sleeve valve 8, facilitating by the increased area thereof the escape from the container. By providing this annular groove in the housing and surrounding the valve member 8, the oil or other fluid, when the ports of the valve are in register with the outlet, may escape in greater volume.

The float 16, as seen, swings freely with the rod 15 upon its pivot and, regardless of the agitation within the container, operates the valve 8 steadily, evenly and easily. The valve sleeve 8 being open throughout its entire length, allows oil to enter and pass through same, where for any reason, oil might find entry into the sleeve from above.

What I claim, is:

1. An automatic valve for oil and gas separators comprising, in combination with such separators, a housing having a cylindrical bore and an outlet at right angles to said bore, said housing having an annular groove coaxial with said outlet, a hollow cylindrical open-ended body within said housing and provided with a plurality of openings, a means extended freely through and suspended from the top of said hollow cylindrical body, and a float on the end of said means for operating said valve.

2. An automatic valve for oil and gas separators comprising, in combination with such separator, a housing having a vertical cylindrical bore, and an outlet at right angles to said bore, a hollow cylindrical body within said housing and provided with a plurality of openings, a rod pivotally supported by and freely movable within said body, and a float on said rod for operating said cylindrical body.

3. An automatic valve for gas and oil separators comprising a housing having a vertical cylindrical bore and an outlet at right angles to said bore, a hollow cylindrical body within said housing and provided with a plurality of ports arranged for registry with said outlet, and means for moving said cylindrical body relatively to said housing comprising a rod pivotally suspended from the top of and extending freely through and within said cylindrical body, and a float on the end of said rod.

4. An automatic valve for oil and gas separators comprising an open-ended housing having a lateral outlet leading therefrom, and formed with an inwardly extending annular groove co-axial with said outlet, a hollow cylindrical open-ended sleeve within said housing and provided with oil grooves, said sleeve having ports arranged for registry with the outlet from said housing, a rod pivotally carried by said sleeve and extending freely through said sleeve, and a float on the end of said rod to operate said valve.

5. An automatic valve for oil and gas separators comprising a housing having a cylindrical bore and an outlet at right angles to said bore, said housing having an inwardly extending annular groove co-axial with said outlet, a hollow cylindrical sleeve within said housing and provided with oil grooves, said sleeve open at both ends and having ports penetrating the wall thereof and adapted for registry with the outlet in said housing, said sleeve provided on the top thereof with a shoulder for engaging the top of said housing and limiting the downward movement of said sleeve, ears on said sleeve, a rod pivotally carried in said ears and extending through said sleeve, and a float on said rod for operating said sleeve.

In testimony whereof I have set my hand.

EDWIN C. WEISGERBER.